(12) United States Patent
Linnartz

(10) Patent No.: US 8,065,533 B2
(45) Date of Patent: *Nov. 22, 2011

(54) RELIABLE STORAGE MEDIUM ACCESS CONTROL METHOD AND DEVICE

(75) Inventor: Johan Paul Maria Gerard Linnartz, Eindhoven (NL)

(73) Assignee: Intrinsic ID B.V., Eindhoven (NL)

( * ) Notice: Subject to any disclaimer, the term of this patent is extended or adjusted under 35 U.S.C. 154(b) by 144 days.

This patent is subject to a terminal disclaimer.

(21) Appl. No.: 12/488,459

(22) Filed: Jun. 19, 2009

(65) Prior Publication Data

US 2009/0259852 A1    Oct. 15, 2009

(51) Int. Cl.
*H04L 9/32* (2006.01)
*H04L 9/00* (2006.01)
*G06F 11/30* (2006.01)

(52) U.S. Cl. ........ 713/193; 713/176; 713/177; 713/178; 713/179; 380/278; 380/279; 380/280; 380/281

(58) Field of Classification Search ................... 713/193
See application file for complete search history.

(56) References Cited

U.S. PATENT DOCUMENTS

| | | | |
|---|---|---|---|
| 5,724,327 A | 3/1998 | Timmermans et al. | |
| 6,118,873 A * | 9/2000 | Lotspiech et al. | 380/277 |
| 6,125,445 A | 9/2000 | Arditti et al. | |
| 6,209,092 B1 | 3/2001 | Linnartz | |
| 6,888,944 B2 * | 5/2005 | Lotspiech et al. | 380/278 |
| 2001/0025342 A1 | 9/2001 | Uchida | |
| 2002/0073317 A1 | 6/2002 | Hars | |
| 2002/0170966 A1 | 11/2002 | Hannigan et al. | |

FOREIGN PATENT DOCUMENTS

| | | |
|---|---|---|
| EP | 0706174 A1 | 4/1996 |
| EP | 0706174 B1 | 4/1996 |
| EP | 0741382 A1 | 6/1996 |
| EP | 0163812 B1 | 12/2000 |
| EP | 1063812 A2 | 12/2000 |
| GB | 2348584 A | 10/2000 |
| JP | 08-036803 A | 2/1996 |
| JP | 08-212681 A | 8/1996 |
| JP | 2001-202694 A | 7/2001 |
| JP | 2002-230783 A | 8/2002 |
| WO | 0051244 A1 | 8/2000 |
| WO | 01-03136 A2 | 1/2001 |
| WO | 0195327 A2 | 12/2001 |
| WO | 0217316 A1 | 2/2002 |
| WO | 02-091377 A1 | 11/2002 |

OTHER PUBLICATIONS

Ravikanth Pappu, et al: Physical One-way Functions, vol. 297, Sep. 2002, pp. 2026-2030, XP-002285061.
Ari Juels, et al: A Fuzzy Commitment Scheme, Nov. 1999, pp. 28-36, XP-002285060.
Jean-Paul Linnertz, et al; New Shielding Functions to Enhance Privacy and Prevent Misuse of Biometric Templates, 2003, pp. 393-402, XP-002285062.

* cited by examiner

*Primary Examiner* — Longbit Chai
(74) *Attorney, Agent, or Firm* — Thorne & Halajian, LLP; Gregory L. Thorne

(57) ABSTRACT

A method of and device for granting access to content on a storage medium, including obtaining cryptographic data from a property, such as a wobble, of the storage medium, reading helper data from the storage medium, and granting the access based on an application of a delta-contracting function to the cryptographic data and the helper data. The delta-contracting function allows the choice of an appropriate value of the helper data, such that any value of the cryptographic data which sufficiently resembles the original primary input value leads to the same output value. Substantially different values of the cryptographic data lead to different values of the output.

18 Claims, 2 Drawing Sheets

RELIABLE STORAGE MEDIUM ACCESS CONTROL METHOD AND DEVICE

Figure 1:
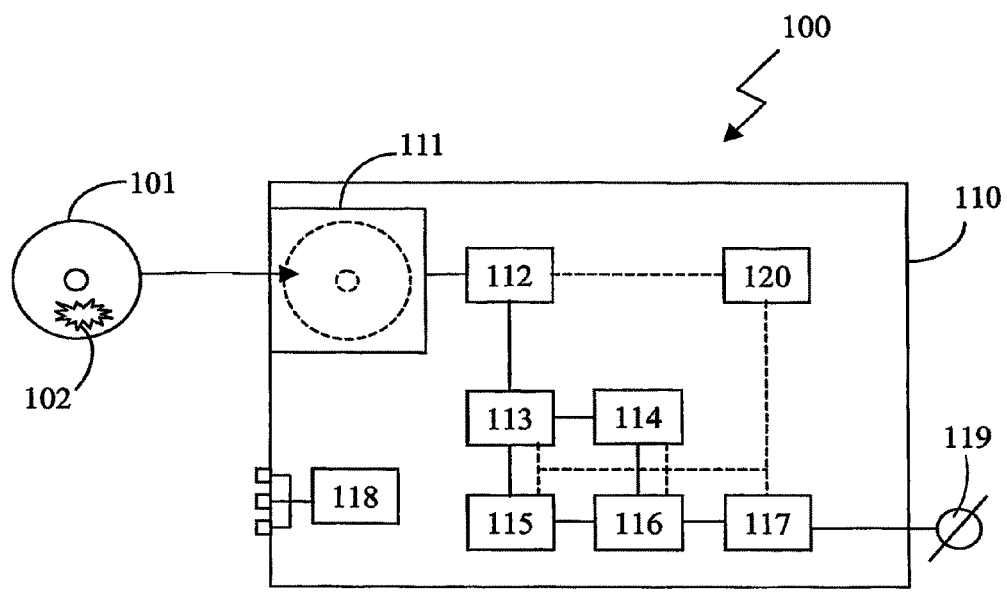

This application claims the benefit of U.S. patent application Ser. No. 10/542,904, filed Jul. 20, 2005.

The invention relates to a method of and device for granting access to content on a storage medium in which cryptographic data used in determining whether access should be granted is obtained from a property of the storage medium.

The invention further relates to a playback and/or recording apparatus comprising such a device, and to a computer program product arranged to cause a processor to execute the method according to the invention.

To protect content on storage media like CDs, DVDs and so on against unauthorized copying, the content is often stored in an encrypted fashion. This means that an authorized playback apparatus needs to be able to obtain the necessary decryption keys, preferably in such a way that unauthorized playback apparatus cannot obtain these keys. Typically these decryption keys are generated from data hidden on the storage medium, preferably together with data hidden in the player. Authorized players are provided with such data during manufacture. This system is used for instance for DVD video.

In the above a cloning attack is possible in which the encrypted content and the decryption data hidden on the storage medium can be copied as a whole onto a second storage medium. Protection against such a cloning attack can be achieved by hiding the decryption data in the disc itself, rather than by storing it as data on the storage medium. One way to do this is through the use of a so-called "wobble". The decryption data is obtained from the storage medium as variations in a physical parameter of the storage medium. Different media will have a different wobble or no wobble at all, so a different decryption key will be generated for that disc, which means that decryption of the content will fail. Reference is made to U.S. Pat. No. 5,724,327 to the same assignee as the present invention which describes various techniques to create such a "wobble" and to store information in it.

Natural aberrations that occur in the pressing process of recordable CD or DVD discs can be used to create a cryptographic key to encrypt the content that will be recorded on these discs. Reference is made to EP-A-0 706 174 for an example of using natural properties of a disc to generate a unique identifier. A known problem in such an approach is that small deviations in the measurement of the physical properties can lead to the wrong key. Usually this is avoided by not using natural properties, but intentionally made, and reliably measurable identifiers. Reference is made to U.S. Pat. No. 6,209,092 to the same assignee and same inventor as the present invention which describes a technique for deriving a cryptographic identifier from intentionally written supplementary data. This requires extra processing of the disc, making the process more complicated and more expensive.

It is an object of the present invention to provide a method according to the preamble, which tolerates small deviations in the measured value of the property of the storage medium.

This object is achieved according to the invention in a method comprising obtaining cryptographic data from a property of the storage medium, reading helper data from the storage medium, and granting the access based on an application of a delta-contracting function to the cryptographic data and the helper data.

A delta-contracting function is a function which has a primary input (the cryptographic data), a secondary input (the helper data) and which generates output based on the primary and secondary inputs. The secondary input is a control input in the sense that it defines ranges of values for the primary input signal and the corresponding output value for each range of primary input values.

More precisely, for any arbitrary original primary input value, the delta-contracting function allows the choice of an appropriate value of the secondary input, such that any value of the primary input which sufficiently resembles said original primary input value leads to the same output value. On the other hand, substantially different values of the primary input lead to different values of the output.

The measured value must be quantized into discrete values before it can be processed cryptographically. As any measurement is likely to contain some noise, the outcome of the quantization may differ from experiment to experiment. In particular if a physical parameter takes on a value close to a quantization threshold, minor amounts of noise can change the outcome. After applying the quantized data to a cryptographic function, minor changes will be magnified and the outcome will bear no resemblance to the expected outcome. This is fundamentally a necessary property of cryptographic functions.

The delta-contracting function enhances the reliability of the obtained cryptographic data because an appropriate choice for the helper data can be made to adapt the cryptographic data for a particular carrier that lie too close to a quantization threshold. It is now possible to use measurements from naturally occurring aberrations even if such measurements would have a low reliability.

International patent application WO 00/51244 and the corresponding article "A Fuzzy Commitment Scheme" by Ari Juels and Martin Wattenberg, published in G. Tsudik, ed., Sixth ACM Conference on Computer and Communications Security, pages 28-36, ACM Press, 1999, both disclose a so-called fuzzy commitment scheme which authenticates a person based on a measured biometric value that is close, but not necessarily identical to a reference value. The scheme prevents an attacker from learning anything about the reference value. The article only describes biometric applications of the scheme and does not disclose, hint or suggest applying the scheme for copy protection, let alone for wobble-based authentication of storage media.

Various advantageous embodiments are set out in the dependent claims.

It is a further object to provide a device according to the preamble, which is able to tolerate small deviations in the measured value of the property of the storage medium.

This object is achieved according to the invention in a device arranged for granting access to content on a storage medium, comprising first reading means for obtaining cryptographic data from a property of the storage medium, second reading means for reading helper data from the storage medium, and access control means for granting the access based on an application of a delta-contracting function to the cryptographic data and the helper data.

Figure 2:
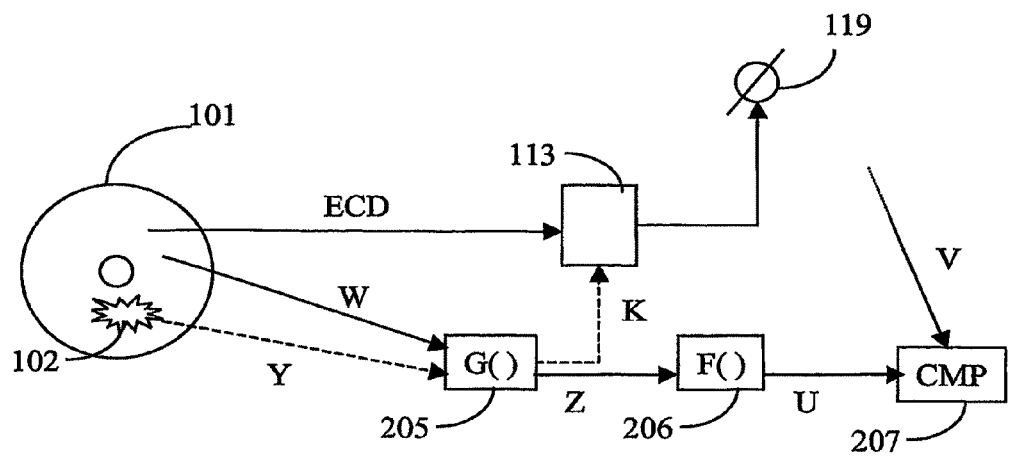
Figure 3:
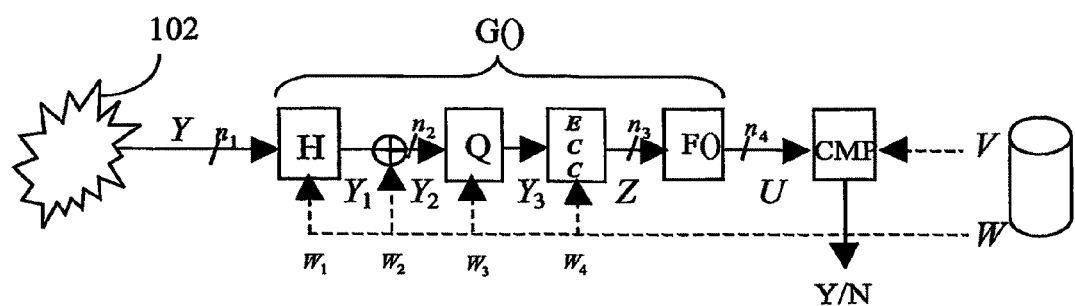
Figure 4:
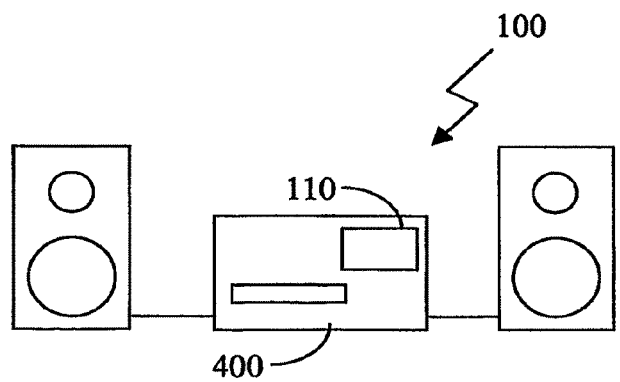

These and other aspects of the invention will be apparent from and elucidated with reference to the embodiments shown in the drawings, in which:

FIG. 1 schematically shows a system comprising a storage medium and a host apparatus in accordance with the invention;

FIG. 2 schematically illustrates an authorization process;

FIG. 3 schematically illustrates an embodiment of a delta-contracting function;

FIG. 4 schematically illustrates an audio playback apparatus comprising the host apparatus.

Throughout the figures, same reference numerals indicate similar or corresponding features. Some of the features indicated in the drawings are typically implemented in software, and as such represent software entities, such as software modules or objects.

FIG. 1 schematically shows a system 100 comprising a storage medium 101 and a host apparatus 110 in accordance with the invention. The host apparatus 110 comprises a receptacle 111 in which a user can place the storage medium 101, a read module 112 for reading data from the storage medium 101, various processing means 113-117 for processing content read from the storage medium 101 and for feeding the processed content data to an output 119, and a user input module 118 using which the user can control operation of the host apparatus 110. The host apparatus 110 also comprises a control module 120, whose workings are discussed below.

In FIG. 1, the host apparatus 110 is embodied as an optical disc drive, for example a Compact Disc (CD) or Digital Versatile Disc (DVD) reader. The apparatus 110 could however also easily be embodied as a floppy disc drive or as a reader for storage media such as removable hard disks, smart cards, flash memories and so on. The system 100 of which the host apparatus 110 is a part can be for instance a Compact Disc player and/or recorder, a Digital Versatile Disc and/or player/recorder, a personal computer, a television or radio system, and so on. FIG. 4 schematically illustrates an audio playback apparatus 400 comprising the host apparatus 110. The apparatus 400 is arranged to play back and/or make a recording of the content on the storage medium 101 only if appropriate access is granted by the host apparatus 110. For example, if the host apparatus 110 only grants read access, the apparatus 400 will make no recording or copy of the content.

After the user places the storage medium 101 in the receptacle 111, the read module 112 is activated. This activation can be automatic or be in response to a user activation of the user input module 118, for example by pressing a button. It is assumed that authorization is needed for access to content recorded on the storage medium 101, for example to allow the content to be read out, played back, processed or copied. To establish whether access is authorized, the read module 112 now reads cryptographic data from the storage medium 101 and feeds this cryptographic data to the control module 120.

The control module 120 receives the cryptographic data and attempts to authorize the access based on this data. Possibly this attempt also involves cryptographic data stored in the host apparatus 110 or cryptographic data supplied by the system 100. If this authorization cannot be established, the control module 120 indicates an error status, for example by supplying an error signal to the output 119 or by activating a LED on the front panel of the host apparatus 110.

If authorization is established, the read module 112 reads the content data from the storage medium 101 and feeds it to the processing means 113-117. It is possible that different reading means are necessary for reading the cryptographic, data and for reading the content data, depending of the nature in which the cryptographic data is stored. The output of the processing means 113-117 goes to the output 119, from which the content can be read by other components of the system 100 (e.g. by rendering it as a movie, or generating audio signals to be rendered on loudspeakers). It may be desirable to first let the host apparatus 110 establish that it is installed in a compliant system 100. This is especially important when the output 119 is a digital output. If the compliance of the system 100 cannot be established, no content should be presented on the output 119.

The host apparatus 110 can be equipped with a great variety of processing means. In the exemplary embodiment of FIG. 1, the processing means comprise a decryption module 113, a watermark detection module 114, a conditional access module 115, a signal processing module 116, and a bus encryption module 117.

First, the content as it is read from the storage medium 101 is decrypted by the decryption module 113 using a decryption key supplied by the control module 120. The watermark detection module 114 processes the decrypted content data to find a watermark with embedded data contained therein. The watermark could comprise, for example, digital rights management data, an identification of the content owner or a reference to the storage carrier.

The conditional access module 115 is arranged to regulate access to the content data. It could be programmed to enforce a strict no-copying regime, or to not allow the content to be fed to a digital output. In that case, the conditional access module 115 signals to the signal processing module 116 that only analog signals are to be generated and fed to the output 119. The conditional access module 115 could also be programmed to switch on (Macrovision or other) copy protection mechanisms in the signals to be fed to the analog output 119. The conditional access module 115 could also be programmed to embed a particular type of watermark in the signals to be fed to the output 119. The conditional access module 115 could also be programmed to switch on encryption of a particular type in the signals to be fed to a digital output 119.

The signal processing module 116 is responsible for transforming the content data into signals that can be presented on the output 119. This comprises for example generating analog audio and/or video signals, but could also comprise embedding watermark data into signals, filtering out particular portions of the content, generating a trick play version of the content and so on. The exact signal processing or transformation operations to be performed depend on e.g. the type of content, digital rights management data embedded in the content, output of the conditional access module 115, and so on.

The bus encryption module 117 encrypts the audio and/or video signals to be presented on the output 119. For example, the host apparatus 110 could engage in an authentication protocol with another component of the system 100. As a result of this authentication protocol the host apparatus 110 and the other component share a secret key. The content can now be encrypted with the secret key and be presented on the output 119 in encrypted form. This way, other components that can read from the output 119 (for example by listening on the bus to which the output 119 is connected) cannot gain access to the content.

It is important to note that the processing modules 113-117 are all components of the host apparatus 110 that may be implemented in whole or in part in software. It is not necessary to always use all of these modules 113-117. Flexible configuration and control of these modules 113-117 can be achieved by using the approach described in European patent application serial number 02077406.3 to the same assignee as the present application.

The cryptographic data is encoded on the storage medium 101 as variations 102 in a physical parameter of the storage medium, said variations exhibiting a modulation pattern representing the cryptographic data. Such a physical parameter of a storage medium is sometimes referred to as a "wobble" on the storage medium. Reference is made to U.S. Pat. No. 5,724,327 to the same assignee as the present invention which describes various techniques to create such a "wobble" and to store information in it. Of course naturally occurring variations in said physical parameter can also be used as the seed.

Preferably the cryptographic data is represented as a pattern of optically detectable marks alternating with intermediate areas arranged along said track thereof. These variations 102 preferably are variations in the track position in a direction transverse to the track direction.

In another embodiment the storage medium 101, having information marks along a track thereof, exhibits first variations caused by existence and non-existence of the information marks along the track, which first variations represent an information signal recorded on the record carrier, and second variations caused by variations associated with the track, which second variations exhibit a modulation pattern representing a code.

Other options for obtaining the cryptographic data are also possible. Reference is made to a paper by R. Papu, B. Recht, J. Taylor and N. Gerhenfeld, "Physical one-way functions", Science, Vol. 297, 20 Sep. 2002, pp. 2026-2030. Disordered, scattering media are excited by a laser beam, and the resulting light pattern is measured. Such media could be used somewhere on the surface or embedded in an optical disc. The measured light pattern then serves as the cryptographic data. For this method it is also well recognized that reliability needs to be enhanced.

The read module 112 now reads out these variations 102 in a physical parameter of the storage medium, and reconstructs the cryptographic data, which is then supplied to the control module 120. Measurement of the variations in the physical parameter usually requires a special circuit, for instance connected to the servo control loop of the optical pick-up of the disc. The measured variations may comprise the cryptographic data with additional data, for example a Cyclic Redundancy Check (CRC) to compensate for small errors in the measurement. The cryptographic data may be stored in a compressed or otherwise encoded fashion. It may thus be necessary to decompress, decode or otherwise process the measured variations before the cryptographic data is available in usable form. If these variations have to be augmented or processed otherwise before they can be used for other purposes, then the processed variations represent the cryptographic data.

It is observed that the physical parameter does not have to be chosen such that it can be reliably measured. Natural aberrations that occur in the pressing process of recordable CD or DVD discs can be used as parameter. This will be explained in more detail below.

The read module 112 also reads helper data from the storage medium 101. This helper data can be recorded on the storage medium 101 in an ordinary fashion, for example as a data track on a CD, or in a special sector of the medium 101. It could conceivably also be embedded in the content recorded on the storage medium 101 e.g. using a watermark.

The authorization process in the control module 120 based on which access is granted to the storage medium 101 is based on an application of a delta-contracting function to the cryptographic data and the helper data. To discuss this application, first some notation is discussed.

Y: the cryptographic data, as obtained by measuring the value of the physical parameter of the storage medium 101.
W: the helper data read from the storage medium 101.
V: a control value.
G( ): the delta-contracting function.
F( ): a cryptographic function, preferably a one-way hash function in the strict sense, but any cryptographic function can be used if it can achieve the desired cryptographic properties, for example a keyed one-way hash function, a trapdoor hash function, an asymmetric decryption function or even a symmetric encryption function.

The authorization process, illustrated in FIG. 2, now proceeds as follows. The cryptographic data Y and the helper data W are both obtained as described above and fed to contracting module 205. Here the delta-contracting function G( ) is applied to the cryptographic data Y and the helper data W:

$$Z=G(Y,W)$$

The cryptographic function F( ), for example one of the well-known cryptographic one-way hash functions SHA-1, MD5, RIPE-MD, HAVAL or SNERFU, is applied to the output of the delta-contracting function G( ) in hashing module 206:

$$U=F(Z)=F(G(Y,W))$$

The output U of the function F( ) is compared in comparator 207 against a control value V. If U matches V, authorization is granted, otherwise no authorization is granted. The control value V can be present on the storage medium 101 just like the helper value W, or be obtained through another path. For example, it could be stored on a smart card, on a Chip-In-Disc affixed to the storage medium (see e.g. international patent application WO 02/17316 by the same applicant as the present application) or be obtained by contacting an external server.

The control value V is computed beforehand, for example during production of the storage medium 101 or when recording the content on the storage medium 101. The physical parameter is read out to obtain a value X. The value V is computed as the output of an application of the hash function F( ) to some secret value S chosen (pseudo-)randomly:

$$V=F(S)$$

The secret value S is also used to determine the helper value W. W is calculated such that G(X, W) equals S. In practice this means that G( ) allows the calculation of an inverse $W=G^{-1}(X, S)$.

As explained above, for any arbitrary primary input value, the delta-contracting function G( ) allows the choice of an appropriate value of the secondary input, such that any value of the primary input which sufficiently resembles said original primary input value leads to the same output value. On the other hand, substantially different values of the primary input lead to different values of the output.

A highly desirable, but for the purpose of the invention not strictly necessary property is that of "epsilon revealing". This property addresses the situation that a dishonest verifier sees only the value of the secondary input of the function, but not the primary input. In this case, the verifier should learn little (say, not more than epsilon) about the output value. A typical example of such an attack is a disc drive modified by a hacker that attempts to get data from an illegally copied disc, without the cryptographic data Y.

As a first embodiment, the secondary input can be chosen as an exhaustive list of all possible primary input values and their corresponding output value. A second embodiment uses a function which subtracts the secondary input from the primary input and rounds the result to the nearest integer, or which maps the result of the subtraction to the nearest point on a given geometrical lattice (see the above-referenced paper by Juels and Wattenberg).

In another embodiment, the primary input Y is assumed to be a vector of values. The secondary input is a vector W which contains information about which entries of Y contain 'large' values that do not cause ambiguity if these would be quantized into a discrete value. This Z=W*sign(Y), where * is an entry-by-entry multiplication, and vector W contains 0 and 1 values. The function sign(Y) returns −1 if Y is negative, +1 if Y is positive and 0 if Y equals 0. The resulting vector thus contains −1, 0, and 1 s.

In another embodiment, G(W,Y) applies an error correction scheme. Y is quantized into discrete values. W contains redundancy. As an example here, consider a Hamming(7,4) code that can correct one error. In this example of a (7,4) code, the length of Y plus the length of W is 7, and the length of Y is 4. Hence W should be of length 3. Y contains 4 elements: $Y=(y_1, y_2, y_3, y_4)$ and W contains 3 elements: $W=(w_1, w_2, w_3)$. During the enrollment, one defines $w_1=\text{sign}(x_1)\oplus\text{sign}(x_2)\oplus\text{sign}(x_3)$ $w_2=\text{sign}(x_1)\oplus\text{sign}(x_2)\oplus\text{sign}(x_4)$ $w_3=\text{sign}(x_1)\oplus\text{sign}(x_3)\oplus\text{sign}(x_4)$ The output Z contains 3 elements $(z_1, z_2, z_3)$. These are computed as $(z_1,z_2,z_3)=G(\text{sign}(y_1),\text{sign}(y_2),\text{sign}(y_3),\text{sign}(y_4),w_1,w_2,w_3)$ where G is a decoding function, for instance as described in J. B. Fraleigh, "A first code in Abstract Algebra", Addison Wesley, Reading, Mass., 1993, 5th Ed. p 149-157. A nearest neighbor decoder investigates the 7-bit string $\text{sign}(y_1),\text{sign}(y_2),\text{sign}(y_3),\text{sign}(y_4),w_1,w_2,w_3$ If the string does not satisfy the condition $w_1=\text{sign}(y_1)\oplus\text{sign}(y_2)\oplus\text{sign}(y_3)$, $w_2=\text{sign}(y_1)\oplus\text{sign}(y_2)\oplus\text{sign}(y_4)$ and $w_3=\text{sign}(y_1)\oplus\text{sign}(y_3)\oplus\text{sign}(y_4)$, the decoder will attempt to flip one of the bits in the 7-bit string until either the modified string satisfies the above condition or all bits have been flipped without the modified string satisfying the condition. This function apparently is delta-contracting with delta equals 1 bit. The control value V is precalculated during the enrollment, as $V=F(s_1, s_2, s_3)$.

Although this function G( ) is delta-contracting, i.e., it is insensitive to minor disturbances in Y, it has less favorable properties in terms of hiding the value of Z if only W is known. In fact, the function is three-bit revealing: For a given W, the uncertainty in Y is reduced from 4 bits to 1 bit. Nonetheless, for larger code words these properties can be made more favorably, particularly if the rate of the code is significantly less than one half. In such case only a small number of redundancy bits W are offered to the verifier, relative to the number of unknown bits in Y. Reference is made to the above-referenced paper by Juels and Wattenberg for a discussion on the use of coding.

In yet another embodiment, the primary and secondary inputs are vectors of identical length: $Y=(y_1, y_2, y_3, \ldots)$, $W=(w_1, w_2, w_3, \ldots)$ and $Z=(z_1, z_2, z_3, \ldots)$ For the i-th dimension of Y, W and Z, the delta-contracting function G( ) is $$z_i = \begin{cases} 1 & \text{if } 2nq \leq y_i + w_i < (2n+1)q, \text{ for any } n = \ldots, -1, 0, 1, \ldots \\ 0 & \text{if } (2n-1)q \leq y_i + w_i < nq, \text{ for any } n = \ldots, -1, 0, 1, \ldots \end{cases}$$

with q the step size.

During enrollment, the i-th element of X (denoted as $x_i$) is measured. For W, a value of $w_i$ must be computed such that the value of $x_i+w_i$ is pushed to a value where $x_i+w_i+\delta$ will be quantized to the same $z_i$ for any small $\delta$. An secret value of S is chosen as a vector of the same length as Y, W and Z. For the i-th dimension of S, $w_i$ and integer n are chosen such that, for the measured $x_i$, $$w_i = \begin{cases} \left(2n + \frac{1}{2}\right)q - x_i & \text{if } s_i = 1 \\ \left(2n - \frac{1}{2}\right)q - x_i & \text{if } s_i = 0 \end{cases}$$

Here $n=\ldots, -1, 0, 1, 2, \ldots$ is chosen such that $-q/2 < w_i < q/2$. The value of n is discarded, but the values of $w_i$ are released as helper data W. The control value V is obtained directly from the secret S, as $V=F(S)$. During authentication, the contracting module 205 executes the delta-contracting function G( ) defined above to obtain Z.

From the embodiments presented thus far, one can recognize the existence of various classes of delta-contracting functions. In a versatile implementation the delta-contracting function can involve one or more of the following operations, in which the helper data W is split up into four parts $W_1$, $W_2$, $W_3$ and $W_4$:

a (linear) matrix multiplication on the primary input vector Y (where $W_1$ defines the matrix).
  the linear addition of helper data $W_2$, e.g. as Y+W2 (illustrated in the last mentioned embodiment).
  a quantization, where $W_3$ defines the quantization areas
  error correction decoding, where $W_4$ can for instance contain redundancy bits (illustrated as the Hamming(7,4) code, where the redundancy bits are taken directly from the helper data)

FIG. 3 gives an example of the combination of all above operations. The delta contracting function G( ) is split into a linear matrix operation H (over the real or complex numbers), the addition of helper data $W_2$, a quantizer/slicer Q, and an error correction code (ECC) block.

The operation H uses helper data $W_1$ to produce output $Y_1$ which is $n_1$ bits long. The result of adding helper data $W_2$ is output $Y_2$, which is $n_2$ bits long. $Y_2$ is fed into quantizer/slicer Q which produces from $Y_2$ and $W_3$ an output $Y_3$ also of length $n_2$. The ECC block calculates $n_3$ reliable bits Z from input $Y_3$ and $W_4$. The cryptographic function F( ) hashes Z into U of length $n_4$ bits.

As the example embodiment of the Hamming (7,4) code has shown, it has advantages in terms of information concealing properties, to refrain from using error correction redundancy bits in the helper data. That is, it is useful to consider a sub-class of delta-contracting functions (redundancy-free delta-contracting functions) where the helper data is not inserted in the form of redundant bits (e.g. CRC bits) in an error correcting code. The redundant bits offered to the decoder are generated in the same way from the primary and secondary input as the information bits, as opposed to using helper bits directly as input to the error correction decoder. The redundancy-free delta-contracting function may nonetheless contain error correction decoding. In FIG. 3 this would mean that signal W4 is not present.

It is possible to use the value Z as the basis for a decryption key K for decrypting, in the decryption module 113, the encrypted content data ECD. The value Z could be used as-is, or be processed e.g. by applying a hash function to it. However, the hash function F(Z) should not be used here, because then the decryption key would be equal to the value V which is available in plain text. Nonetheless, to conserve the complexity of a practical implementation, one may choose to use F(Z'), where Z' is a minor modification of Z, e.g. by flipping one bit.

The decryption key K can be derived further from data supplied by the system 100. For instance, the apparatus 400 in which the host apparatus 110 is installed may be programmed in the factory with a secret value that is concatenated to the derived decryption key to obtain the final decryption key necessary to decrypt the content. The combination of the (processed or unprocessed) value Z and the data supplied by the system could be fed to a hash function to obtain the decryption key.

The control module 120 can subsequently supply the decryption key to the decryption module 113, which can use it as described above to decrypt the content. This way, access to the content is granted implicitly. If the wrong decryption key is obtained, decryption will fail and no proper output can be obtained. In this case it is not necessary to obtain V and compare U against V, because it will be evident from the output that decryption has failed.

Access can also be controlled even if no decryption keys need to be supplied. If the comparator 207 detects a difference between U and V, the control module 120 can suppress signals being presented on the output 119. In other words, regardless of the protection of the content itself, if the data U and V do not match, no access to the content is granted.

This last option makes it possible to use the present invention as a copy prevention scheme, for instance to retrofit a system that does not involve encryption. One example is the legal home recording of downloaded audio to CD-R. The authentication scheme of FIG. 2 can be applied in a new generation of players. The helper value W and the control value V are stored on an empty CD-R in the factory. A recording apparatus stores content in the clear, to ensure compatibility with existing CD players. New players retrieve W and V from the disc, execute the authentication, and play legally created CD-Rs but not illegal bit-copies of these. Such illegal bit-copies will also contain copies of the values W and V, but because this new disc has a different wobble, the value Y on this new disc will lead to a value for U that differs from V.

It should be noted that the above-mentioned embodiments illustrate rather than limit the invention, and that those skilled in the art will be able to design many alternative embodiments without departing from the scope of the appended claims.

For example, international patent application WO 01/95327 by the same applicant as the present application discloses storing data for copy protection and control on a storage medium in the ordinary fashion, whilst using an intentionally-made variation in a physical parameter of the storage medium to store a cryptographic hash of said data. By verifying that a hash of the stored data matches the measured value of the physical parameter access to the storage medium can be regulated. By also storing helper data and using a delta-contracting function according to the present invention, the reliability of this verification is improved.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of calculating reliable bits from cryptographic data; the method comprising acts of:
   obtaining the cryptographic data from a property of a non-transitory medium,
   reading helper data from a storage medium, and
   calculating the reliable bits based on an application of a delta-contracting function to the cryptographic data and the helper data, wherein the helper data defines ranges of values for the cryptographic data and the delta-contracting function defines a corresponding output value for each range of values for the cryptographic data so that the helper data can be made to adapt the cryptographic data for a particular medium in tolerating small deviations in the obtained cryptographic data.

2. The method of claim 1, comprising an act of deriving a decryption key from the reliable bits.

3. The method of claim 2, wherein the act of deriving the decryption key comprises an act of deriving the decryption key from data supplied by a playback or recording apparatus.

4. The method of claim 1, further comprising an act of authorizing the medium if the output value of the delta-contracting function corresponds to a control value.

5. The method of claim 4, comprising acts of applying a cryptographic function to the output of the delta-contracting function and comparing the output of the cryptographic function to the control value.

6. The method of claim 5, in which the cryptographic function is a one-way hash function.

7. The method of claim 4, wherein the control value is stored on a smart card.

8. The method of claim 1, in which the delta-contracting function involves a combination of one or more of a matrix multiplication on the cryptographic data, a linear addition of at least a portion of the helper data, a quantization in which the quantization areas are defined by a portion of the helper data, and error correction decoding.

9. The method of claim 1, wherein the variations in a physical property of a medium are naturally occurring variations in the physical parameter.

10. The method of claim 1, comprising an act of decrypting content using the decryption key.

11. A device arranged for calculating reliable bits from cryptographic data, comprising first reading means for obtaining the cryptographic data from variations in a physical property of a medium, second reading means for reading helper data from a storage medium, and calculating means for calculating the reliable bits based on an application of a delta-contracting function to the cryptographic data and the helper data, wherein the helper data defines ranges of values for the cryptographic data and the delta-contracting function defines a corresponding output value for each range of values for the cryptographic data so that the helper data can be made to adapt the cryptographic data for a particular medium in tolerating small deviations in the obtained cryptographic data.

12. The device of claim 11, comprising means for deriving a decryption key from the reliable bits.

13. The device of claim 11, wherein the device is a smart card.

14. The device of claim 11, further comprising means for authorizing the medium if the output value of the delta-contracting function corresponds to a control value.

15. The device of claim 14, comprising means for applying a cryptographic function to the output of the delta-contracting function and comparing the output of the cryptographic function to the control value.

16. The device of claim 15, wherein the cryptographic function is a one-way hash function.

17. The device of claim 14, wherein the control value is stored on a smart card.

18. A non-transitory computer-readable medium having a computer program product recorded thereon, said computer program product being arranged to cause a processor to perform acts of:

obtaining cryptographic data from a property of a medium,
reading helper data from a storage medium, and
calculating reliable bits based on an application of a delta-contracting function to the cryptographic data and the helper data, wherein the helper data defines ranges of values for the cryptographic data and the delta-contracting function defines a corresponding output value for each range of values for the cryptographic data so that the helper data can be made to adapt the cryptographic data for a particular medium in tolerating small deviations in the obtained cryptographic data.

* * * * *